United States Patent
Wuerch et al.

(10) Patent No.: US 8,993,663 B2
(45) Date of Patent: Mar. 31, 2015

(54) ACRYLIC BLOCK COPOLYMERS FOR AEROSOLS AND AEROSOL ADHESIVES

(71) Applicant: 3M Innovative Properties Company, St. Paul, MN (US)

(72) Inventors: Daniel W. Wuerch, Maplewood, MN (US); John W. Vanderzanden, Maplewood, MN (US); Kurt C. Melancon, White Bear Lake, MN (US); Vivek Bharti, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/132,166

(22) Filed: Dec. 18, 2013

(65) Prior Publication Data

US 2014/0103076 A1   Apr. 17, 2014

Related U.S. Application Data

(62) Division of application No. 13/139,526, filed as application No. PCT/US2009/067276 on Dec. 9, 2009, now Pat. No. 8,637,595.

(60) Provisional application No. 61/141,562, filed on Dec. 30, 2008.

(51) Int. Cl.
| | | |
|---|---|---|
| C09J 11/08 | (2006.01) | |
| C09J 153/00 | (2006.01) | |
| C09K 3/30 | (2006.01) | |
| C08L 53/00 | (2006.01) | |
| C08L 93/04 | (2006.01) | |
| B65D 83/14 | (2006.01) | |
| C09J 11/06 | (2006.01) | |

(52) U.S. Cl.
CPC ............. *C09J 153/00* (2013.01); *C08L 53/00* (2013.01); *C08L 93/04* (2013.01); *C09K 3/30* (2013.01); *B65D 83/752* (2013.01); *C09J 11/06* (2013.01); *C08L 2205/02* (2013.01)
USPC ........................... 524/271; 524/272; 524/523

(58) Field of Classification Search
None
See application file for complete search history.

(56) References Cited

U.S. PATENT DOCUMENTS

| | | | |
|---|---|---|---|
| 3,400,095 A | 9/1968 | Kremer | |
| 3,400,995 A | 9/1968 | Borberg | |
| 3,578,622 A | 5/1971 | Brown | |
| 3,776,873 A | 12/1973 | Kremer | |
| 4,422,877 A | 12/1983 | Spitzer | |
| 4,994,322 A | 2/1991 | Delgado | |
| 5,089,160 A | 2/1992 | Pallone | |
| 5,280,061 A | 1/1994 | Haraguchi | |
| 5,686,534 A | 11/1997 | Bayard | |
| 6,410,005 B1 | 6/2002 | Galleguillos | |
| 6,806,320 B2* | 10/2004 | Everaerts et al. | .......... 525/330.3 |
| 6,894,114 B2 | 5/2005 | Kato | |
| 7,084,209 B2 | 8/2006 | Everaerts | |
| 2002/0161056 A1 | 10/2002 | Carnahan | |
| 2004/0009136 A1 | 1/2004 | Dubief | |
| 2004/0096411 A1 | 5/2004 | Frechet | |
| 2005/0095207 A1 | 5/2005 | Belli | |
| 2005/0106117 A1 | 5/2005 | Adams | |
| 2005/0220723 A1 | 10/2005 | Benabdillah | |
| 2006/0036030 A1 | 2/2006 | Kurihara | |
| 2011/0135922 A1* | 6/2011 | Joseph et al. | ........... 428/355 AC |

FOREIGN PATENT DOCUMENTS

| | | |
|---|---|---|
| EP | 0 349 270 | 8/1994 |
| EP | 0 616 018 | 9/1994 |
| EP | 1 160 179 | 12/2001 |
| EP | 1 489 116 | 12/2004 |
| EP | 1 586 300 | 10/2005 |
| JP | 46-012640 | 1/1971 |
| JP | 61-241375 | 10/1986 |
| JP | 08-134419 | 5/1996 |
| JP | 10-030078 | 2/1998 |
| JP | 2004-002862 | 1/2004 |
| JP | 2005-120295 | 5/2005 |
| JP | 2008-0088312 | 4/2008 |
| WO | WO 97/18247 | 5/1997 |
| WO | WO 01/96487 | 12/2001 |
| WO | WO 02/28357 | 4/2002 |
| WO | WO 2007/005029 | 1/2007 |
| WO | WO 2007/029783 | 3/2007 |
| WO | WO 2008/065982 | 6/2008 |

OTHER PUBLICATIONS

Cheng, H. N., "Using Analytical Techniques to Characterize Adhesives," *Adhesives Age*, (Dec. 1988), 5 pages.

Flick ed., Corrosion Inhibitors: An Industrial Guide, $2^{nd}$ Edition, Noyes Publications, Park Ridge, NJ (1993).

"Processing Agent for Plastic Rubber," compiled by Shanxi Provincial Institute of Chemical Industry, (Jun. 1997), *Chemical Industrial Press*, pp. 623-627.

"Liquid Formulations," A Series of Books about Form of Preparation for Processing Pesticides, *Chemical Industrial Press*, (Jan. 2004), pp. 188-189.

(Continued)

*Primary Examiner* — Vu A Nguyen
(74) *Attorney, Agent, or Firm* — Julie Lapos-Kuchar

(57) ABSTRACT

An aerosol is described comprising a composition comprising an acrylic block copolymer, a solvent, and a propellant. An article is described comprising the aerosol contained within a pressurized containment vessel comprising a valve. An aerosol mist is also described comprising droplets of an adhesive composition, wherein the adhesive composition comprises an acrylic block copolymer, a glass transition temperature modifier, and optionally an additive.

18 Claims, No Drawings

(56) References Cited

OTHER PUBLICATIONS

Tong, et al., "Synthesis of poly(methyl methacrylate)-b-poly($n$-butyl acrylate)-b-poly(methyl methacrylate) triblocks and their potential as thermoplastic elastomers", *Polymer*, 41 (2000) pp. 2499-2510.

Search Report for International Application No. PCT/US2009/067276, dated Jul. 22, 2010, 3 pages.
EP Extended Search Report, EP09836753.5, dated May 25, 2012, 3 pages.

* cited by examiner

ACRYLIC BLOCK COPOLYMERS FOR AEROSOLS AND AEROSOL ADHESIVES

TECHNICAL FIELD

Aerosol compositions and articles therefrom are described. In some embodiments, the aerosol is an adhesive.

BACKGROUND

Adhesive compositions may be applied to a substrate via extruding (e.g., the adhesive is melt extruded onto the substrate, or coextruded with the substrate), blowing (e.g., the adhesive is blown into microfibers), solvent coating (e.g., the adhesive is solubilized and/or dispersed in a solvent, applied to a substrate, and the solvent is evaporated off), spraying (e.g., an adhesive is contained in a container and a secondary means of pressure is used to propel the adhesive from the container), or aerosol spraying (e.g., the adhesive and a propellant are enclosed in a common container and the propellant is the sole source of energy to propel the adhesive from the container).

Aerosol spraying of an adhesive presents specific challenges and, therefore, not all adhesive compositions may be used for aerosol spraying. For example, the aerosol adhesive should not only provide adequate adhesion once dispensed, but should flow out of the vessel in a usable spray, should not gum up the delivery mechanism (such as the valve or actuator), and should not cause soak-in of the substrate to which it was applied.

Aerosol adhesives may include a polymer, which along with any glass transition temperature modifiers is the adhesive; a solvent, which acts to dilute or suspend the adhesive; a propellant, which acts to propel the adhesive composition from the containment vessel; and any additional additives. The aerosol adhesive may be classified based on its spray pattern, as: (i) a mist (or particle) spray, (ii) a lace (or web) spray, or (iii) a combination of a mist spray and a lace spray.

Mist sprays deliver small particles of adhesive in a round or fan shape pattern with minimal to no cobwebbing (or strings) observed in the spray pattern and a variable amount of overspray. Mist sprays may be further categorized as a fine mist spray or a coarse mist spray. One skilled in the art would be able to distinguish coarse mist spray from fine mist spray based on the particle size distribution. Mist sprays deposit a uniform coat of adhesive that is not visible through thin materials such as paper. Traditionally, mist sprays produce a drier application of adhesive than lace sprays because less of the aerosol adhesive soaks into the substrate. Mist spray adhesives are typically based on cross-linked polymers, which are not solubilized in the containment vessel (i.e., the polymer is not soluble in the solvent). These cross-linked polymers, therefore, may settle out of solution and the containment vessel often needs to be shaken before use. Shaking of the containment vessel may not be practical when the containment vessel is a large canister weighing several hundred pounds. Recently, mist sprays have been formulated with hydrogenated styrenic block copolymers that are soluble in the solvent. See for example, European Pat. No. 0 616 018 (Nguyen). However, the mist sprays made with hydrogenated styrenic block copolymers typically give a low strength temporary or removable type of adhesive due to the low amount of adhesive delivered out of the containment vessel. Typically, mist sprays have a solids content of adhesive of about 5 to 25% by weight versus total weight.

Lace sprays deliver a string (or cobwebbed) pattern of adhesive in a controlled fan shaped pattern with little or no overspray. Lace sprays may be further categorized as a light lace spray or a heavy lace spray. One skilled in the art would be able to distinguish a light lace spray or a heavy lace spray based on the thickness of the resulting adhesive. Lace sprays give a textured surface of adhesive, generally give a thicker bondline than mist sprays, and are considered a higher strength adhesive than the mist spray adhesives. Lace sprays traditionally are based on soluble polymers such as, e.g., styrene block copolymers (e.g., styrene-butadiene-styrene (SBS), styrene-isoprene-styrene (SIS), styrene-ethylene-butylene-styrene (SEBS), styrene-ethylene-butylene (SEB), styrene-ethylene-propylene-styrene (SEPS), styrene-ethylene-propylene (SEP)), styrene-butadiene rubber, ethylene vinyl acetate, neoprene, and nitrile. Typically, lace sprays have a soluble polymer concentration of less than 25% by weight versus total weight.

SUMMARY

There is a need for improved aerosol compositions. For example, aerosol adhesives that comprise a higher content of adhesive in the spray, are environmentally friendly (i.e., use non-VOC (volatile organic compound) solvents), are easier to use (e.g., no need to shake before use), and/or give improved adhesive performance.

In one aspect, an aerosol is described comprising an acrylic block copolymer, a solvent, and a propellant.

In another aspect, an article is described comprising an aerosol contained within a pressurized containment vessel comprising a valve, wherein the aerosol comprises an acrylic block copolymer, a solvent, and a propellant.

In another aspect, an aerosol mist is described comprising droplets of an adhesive composition, wherein the droplets comprise an acrylic block copolymer, a glass transition temperature modifier, and optionally an additive.

The above summary is not intended to describe each disclosed embodiment or every implementation of the present invention. The detailed description which follows, more particularly exemplifies illustrative embodiments.

DETAILED DESCRIPTION

As used herein, the term

"a", "an", "the", and "at least one of" are used interchangeably and mean one or more;

"and/or" is used to indicate one or both stated cases may occur, for example A and/or B includes, (A and B) and (A or B);

"interpolymerized" refers to monomers which are polymerized together to form a polymer backbone;

"room temperature" refers to a temperature in the range of 20° C. to 25° C.;

"(meth)acrylate" refers to compounds containing either an acrylate or a methacrylate structure or combinations thereof;

"copolymer" refers to a polymeric material comprising at least two different interpolymerized monomers (i.e., the monomers do not have the same chemical structure) and include terpolymers (three different monomers), tetrapolymers (four different monomers), etc.;

"polymer" refers to a polymeric material comprising interpolymerized units of the same monomer (a homopolymer) or of different monomers (a copolymer); and "glass transition temperature" or "$T_g$" refers to the temperature at which a polymeric material transitions from a glassy state to a rubbery state. The glassy state is typically associated with a material that is, for example, brittle, stiff, rigid, or combinations thereof. In contrast, the rubbery state is typically associated with a material that is, for example, flexible and elastomeric.

Also herein, recitation of ranges by end points includes the end points and all numbers subsumed within that range (e.g., 1 to 10 includes 1.4, 1.9, 2.33, 5.75, 9.98, etc.).

Also herein, recitation of integer ranges by end points includes the end points and all integers subsumed within that range (e.g., 1 to 10 includes 1, 2, 3, 4, 5, etc.).

The present disclosure relates to an aerosol, which is a liquid substance that when dispensed from a pressurized container is released as a suspension of fine solid particles, liquid droplets, or fibrous strands in a gas. For purposes of this disclosure, the aerosol dispenses as a mist-type of pattern, a lace-type of pattern, or some combination of a mist-type of pattern and a lace-type of pattern.

The aerosol of the present disclosure comprises a composition comprising an acrylic block copolymer. "Block copolymers" of the present disclosure are elastomeric components in which chemically different blocks or sequences are covalently bonded to each other. Block copolymers include at least two different polymeric blocks that are referred to as the A block and the B block. The A block and the B block may have different chemical compositions and different glass transition temperatures.

Block copolymers of the present disclosure can be divided into four main classes: di-block ((A-B) structure), tri-block ((A-B-A) structure), multi-block (-(A-B)$_n$-structure), and star block copolymers ((A-B)$_n$-structure). Di-block, tri-block, and multi-block structures may also be classified as linear block copolymers. Star block copolymers fall into a general class of block copolymer structures having a branched structure. Star block copolymers are also referred to as radial or palmtree copolymers, as they have a central point from which branches extend. Block copolymers herein are to be distinguished from comb-type polymer structure and other branched copolymers. These other branched structures do not have a central point from which branches extend.

The acrylic block copolymers of the present disclosure comprise at least one acrylic monomer. Exemplary acrylic block copolymer may comprise monomer units including: alkyl ester methacrylates such as, e.g., methyl methacrylate, ethyl methacrylate, n-propyl methacrylate, isopropyl methacrylate, n-butyl methacrylate, isobutyl methacrylate, s-butyl methacrylate, t-butyl methacrylate, n-hexyl methacrylate, cyclohexyl methacrylate, 2-ethyl hexyl methacrylate, n-octyl methacrylate, lauryl methacrylate, tridecyl methacrylate, stearyl methacrylate, isobornyl methacrylate, benzyl methacrylate, or phenyl methacrylate; alkyl ester acrylate such as, e.g., n-hexyl acrylate, cyclo hexyl acrylate, 2-ethyl hexyl acrylate, n-octyl acrylate, lauryl acrylate, tridecyl acrylate, stearyl acrylate, n-butyl acrylate, isobutyl acrylate, sec-butyl acrylate, tert-butyl acrylate, or 2-octylacrylate; (meth)acrylate esters such as, e.g., those having the following ester groups: methoxy ethyl(meth)acrylate, ethoxy ethyl(meth) acrylate, diethyl amino ethyl meth)acrylate, 2-hydroxy ethyl (meth)acrylate, 2-amino ethyl(meth)acrylate, glycidyl (meth)acrylate, tetrahydro furfuryl(meth)acrylate; isobornyl (meth)acrylate, and combinations thereof.

The acrylic block copolymer may comprise additional monomer units, for example, vinyl group monomers having carboxyl groups such as, e.g., (meth)acrylic acid, crotonic acid, maleic acid, maleic acid anhydride, fumaric acid, or (meth)acryl amide; aromatic vinyl group monomers such as, e.g., styrene, α-methyl styrene, or p-methyl styrene; conjugated diene group monomers such as, e.g., butadiene or isoprene; olefin group monomers such as, e.g., ethylene, or propylene; or lactone group monomers such as, e.g., ε-caprolactone or valero lactone; and combinations thereof.

In one embodiment of the present disclosure, the acrylic block copolymer comprises: at least two $A_1$ endblock polymeric units that are each independently derived from a monoethylenically unsaturated monomer comprising a (meth) acrylate monomer, a styrenic monomer, or combinations thereof, wherein each $A_1$ endblock has a glass transition temperature of at least 50° C.; and at least one $B_1$ midblock polymeric unit that is derived from a monoethylenically unsaturated monomer comprising a (meth)acrylate monomer, vinyl ester monomer, or combinations thereof, wherein each $B_1$ midblock has a glass transition temperature no greater than 20° C., with the proviso that at least one $A_1$ endblock polymeric unit or one $B_1$ midblock polymeric unit is derived from a monoethylenically unsaturated monomer comprising (meth)acrylate. The $A_1$ blocks have a glass transition temperature of at least 50° C. and the $B_1$ block has a glass transition temperature no greater than 20° C. In many exemplary block copolymers, the $A_1$ blocks have a glass transition temperature of at least 50° C., at least 60° C., at least 80° C., at least 100° C., at least 120° C., at least 140° C., or at least 150° C., while the $B_1$ block has a glass transition temperature of no greater than 20° C., no greater than 10° C., no greater than 0° C., no greater than −10° C., no greater than −20° C., no greater than −40° C., no greater than −60° C., no greater than −80° C., or no greater than −100° C.

Briefly, the $A_1$ endblock polymeric units comprise a (meth) acrylate monomer, a styrenic monomer, or combinations thereof. As used herein to describe the monomers used to form the $A_1$ block polymeric units, the term "combinations thereof" means that more than one type of monomer (e.g., a methacrylate and styrene) or more than one of the same type of monomer (e.g., two different methacrylates) can be mixed. The $A_1$ blocks in the block copolymer can be the same or different. In many block copolymers, all of the $A_1$ block polymeric units are derived from the same monomer or monomer mixture.

In the $A_1$ endblock polymeric units, the (meth)acrylate monomers are reacted to form the $A_1$ blocks. Any (meth) acrylate monomers can be used as long as the $T_g$ of the resulting $A_1$ block is at least 50° C. The (meth)acrylate monomers can be, for example, alkyl methacrylates, aryl methacrylates, or aralkyl methacrylate of Formula (I).

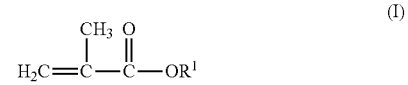

(I)

In Formula (I), $R^1$ is an alkyl, aryl, or aralkyl (i.e., an alkyl substituted with an aryl group). Suitable alkyl groups often have 1 to 6 carbon atoms, 1 to 4 carbon atoms, or 1 to 3 carbon atoms. When the alkyl group has more than 2 carbon atoms, the alkyl group can be branched or cyclic. Suitable aryl groups often have 6 to 12 carbon atoms. Suitable aralkyl groups often have 7 to 18 carbon atoms.

Exemplary alkyl methacrylates according to Formula (I) include: methyl methacrylate, ethyl methacrylate, isopropyl methacrylate, isobutyl methacrylate, tert-butyl methacrylate, cyclohexyl methacrylate, or combinations thereof. In addition to the monomers of Formula (I), isobornyl methacrylate can be used. Exemplary aryl methacrylates according to Formula (I) include: phenyl methacrylate. Exemplary aralkyl methacrylates according to Formula (I) include: benzyl methacrylate, 2-phenoxyethyl methacrylate, or combinations thereof.

In some embodiments, the $A_1$ endblock polymeric units comprise a styrenic monomer. Exemplary styrenic monomers that can be reacted to form the $A_1$ blocks include: styrene, alpha-methylstyrene, and various alkyl substituted styrenes such as, e.g., 2-methylstyrene, 4-methylstyrene, ethylstyrene, tert-butylstyrene, isopropylstyrene, dimethylstyrene, or combinations thereof.

The $B_1$ midblock polymeric of the embodiment mentioned above may be derived from (meth)acrylate monomers, vinyl ester monomers, or combinations thereof. That is, the $B_1$ midblock polymeric unit is the reaction product of a second monomer selected from (meth)acrylate monomers, vinyl ester monomers, or combinations thereof. As used herein to describe the monomers used to form the $B_1$ midblock polymeric unit, the term "combinations thereof" means that more than one type of monomer (e.g., a (meth)acrylate and a vinyl ester) or more than one of the same type of monomer (e.g., two different (meth)acrylates) can be combined. The $B_1$ blocks are often derived from acrylate monomers of Formula (II).

(II)

In Formula (II), $R^2$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or combinations thereof.

In some embodiments, acrylate monomers are reacted to form the $B_1$ block. Exemplary alkyl acrylates of Formula (II) that can be used to form the $B_1$ block polymeric unit include: ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, dodecyl acrylate, or combinations thereof.

Exemplary heteroalkyl acrylates of Formula (II) that can be used to form the $B_1$ block polymeric unit include: 2-methoxyethyl acrylate, 2-ethoxyethyl acrylate, or combinations thereof.

Some alkyl methacrylates can be used to prepare the $B_1$ blocks such as, e.g., alkyl methacrylates having an alkyl group with greater than 6 to 20 carbon atoms. Exemplary alkyl methacrylates include: 2-ethylhexyl methacrylate, isooctyl methacrylate, n-octyl methacrylate, isodecyl methacrylate, lauryl methacrylate or combinations thereof. Likewise, some heteroalkyl methacrylates such as, e.g., 2-ethoxy ethyl methacrylate can also be used. In still other embodiments, the $B_1$ block polymeric unit is derived from vinyl ester monomers. Exemplary vinyl esters include: vinyl 2-ethylhexanoate, vinyl neodecanoate, or combinations thereof. In one particular embodiment, the acrylic block copolymer is a tri-block copolymer and each $A_1$ endblock comprises the reaction product of alkyl methacrylate monomers and the $B_1$ midblock comprises the reaction product of alkyl(meth)acrylates monomers. See U.S. Pat. Appl. No. 61/057532 (Joseph et al.) for a further description of these $A_1$ and $B_1$ block copolymers and the selection of monomers.

Regarding the manufacturing method of the acrylic block copolymer that is used in the present disclosure, no particular limitations are placed as long as the polymers that satisfy the conditions of this invention based on the chemical structure can be attained; and the method in accordance with already known methods may be adapted. In general, a living polymerization method may be used to attain a block copolymer with a narrow molecular weight distribution. Such living polymerization methods include, for example, polymerization using an organic rare earth metal complex as a polymerization initiator, anion polymerization using an organic alkali metal compound as a polymerization initiator in the presence of mineral acid salt such as, e.g., a salt of an alkali metal or an alkali rare earth metal, anion polymerization using organic alkali metal compound as a polymerization initiator in the presence of an organic aluminum compound, or atomic transfer radical polymerization (ATRP). Additional information regarding methods of making acrylic block copolymers may be found, for example, in U.S. Pat. No. 6,806,320 (Everaerts et al.).

The acrylic block copolymers of the present disclosure may have a number average molecular weight (Mn) of at least 50,000 daltons, at least 100,000 daltons, at least 300,000 daltons, at least 1,000,000 daltons, or even at least 1,500,000 daltons. In one embodiment, the acrylic block copolymers have a molecular weight between 75,000 and 150,000 daltons.

In some embodiments, more than one block copolymer is used. For example, multiple block copolymers with different weight average molecular weights or multiple block copolymers with different concentrations of the block polymeric units can be used.

The use of multiple block copolymers with different weight average molecular weights or with different amounts of the block polymeric units can, for example, improve the adhesion properties of composition.

In one embodiment of the present disclosure, the aerosol is an adhesive. A glass transition temperature modifier such as one or more tackifiers, one or more plasticizers, or combinations thereof may be added to the composition to improve the adhesive properties of the composition. Plasticizers and tackifiers are used to adjust the glass transition temperature and/or to adjust the modulus of the composition of the composition to improve the adhesion of the composition to a substrate. Plasticizers and tackifiers known to those skilled in the art may be used.

Examples of suitable plasticizers include: hydrocarbon oils (e.g., those that are aromatic, paraffinic, or naphthenic), hydrocarbon resins, polyterpenes, rosin esters, phthalates (e.g., terephthalate), phosphates esters, dibasic acid esters, fatty acid esters, polyethers (e.g., alkyl phenyl ether), epoxy resins, sebacate, adipate, citrate, trimellitate, dibenzoate, or combinations thereof. The plasticizers may be present in the composition in any suitable amount, such as for example, amounts up to about 50 parts by weight, 70 parts by weight, or even up to about 100 parts by weight, based on 100 parts by weight of the acrylic block copolymer.

Examples of suitable tackifiers include rosins and their derivatives (e.g., rosin esters); polyterpenes and aromatic-modified polyterpene resins; coumarone-indene resins; hydrocarbon resins, for example, alpha pinene-based resins, beta pinene-based resins, limonene-based resins, aliphatic hydrocarbon-based resins, aromatic-modified hydrocarbon-based resins; or combinations thereof. Non-hydrogenated tackifiers resins are typically more colorful and less durable (i.e., weatherable). Hydrogenated (either partially or completely) tackifiers may also be used. Examples of hydrogenated tackifiers include, for example: hydrogenated rosin esters, hydrogenated acids, hydrogenated aromatic hydrocarbon resins, hydrogenated aromatic-modified hydrocarbon-based resins, hydrogenated aliphatic hydrocarbon-based resins, or combinations thereof. Examples of synthetic tackifiers include: phenolic resins, terpene phenolic resins, poly-t-butyl styrene, acrylic resins, or combinations thereof.

Any suitable amount of tackifier may be used. In some embodiments, the tackifier may be present in the composition in an amount of greater than about 40 parts by weight based on 100 parts by weight of the acrylic block copolymer. Optionally, the tackifier may be present in an amount of about 40 parts by weight to about 400 parts by weight, 40 parts by weight to about 200 parts by weight, 60 parts by weight to about 140 parts by weight, or even 80 parts by weight to about 120 parts by weight, based on the weight of the acrylic block copolymer. Higher amounts of tackifier may be desired, however, particularly when formulating heat-activated adhesives.

In some embodiments, the tackifiers may also be selectively combined to improve the performance of the composition. Rosin tackifiers such as, e.g., rosin acids, are typically a mixture of compounds and isomers. Each of the rosin acids and rosin esters typically has three fused carbon rings and has zero, one, two, or three carbon-carbon double bonds. See, for example, Cheng, N. H., *Adhesives Age*, 1988 p. 37-38. Often, each tackifier is a mixture of rosin acids and/or rosin esters with differing degrees of unsaturation (i.e., differing degrees of saturation), which may be determined by 1H NMR (nuclear magnetic resonance). Because of the difference in saturation or hydrogenation of the tackifier, various tackifiers will have a different solubility in the acrylic block copolymer and in the various polymeric units of the acrylic block copolymer. For example, a tackifier with a higher degree of saturation is less compatible or less miscible with the elastomeric regions of the acrylic block copolymer than a tackifier that has a high degree of unsaturation. By knowing the degree of unsaturation present in the tackifier, various tackifiers may be combined to achieve a desirable effect. Described next are two different embodiments of tackifier mixtures.

In one embodiment, the composition comprising the acrylic block copolymer may comprise a first solid tackifier having a glass transition temperature of at least 20° C. and comprising a rosin having at least 35 weight percent of rosin isomers containing olefinic hydrogens; and a second solid tackifier having a glass transition temperature of at least 20° C. and comprising a rosin having no greater than 35 weight percent of rosin isomers containing olefinic hydrogens.

These two tackifiers differ from each other in their degree of saturation. The first solid tackifier is more hydrogenated than the second solid tackifier. Stated differently, compared to the second solid tackifier, the first solid tackifier has a higher degree of saturation and a lower degree of unsaturation.

Each of the first and second solid tackifier can contain, for example, a mixture of rosin acids of and/or isomers thereof and/or rosin esters thereof. The distribution of these rosin acids and/or rosin esters in the first solid tackifier and in the second solid tackifiers, however, is typically different. Compared to the second solid tackifier, the first solid tackifier typically contains a greater amount of a first rosin acid and/or first rosin ester having rosin isomers comprising olefinic hydrogens from unsaturation (typically 2 double bonds), such as, e.g., abietic acid, neoabietic acid, pimaric acid, isopimaric acid, or similar isomers. This does not include the aromatic dehydroabietic acid isomer, which is aromatic. Compared to the first solid tackifier, the second solid tackifier typically contains a lesser amount of a first rosin acid and/or first rosin ester having rosin isomers comprising olefinic hydrogens from unsaturation.

Typically, at least 30 weight percent of the first solid tackifier is a rosin isomer comprising olefinic hydrogens from unsaturation. Some exemplary first solid tackifiers contain at least 35 weight percent, or at least 40 percent of a rosin isomer comprising olefinic hydrogens from unsaturation. Typically, no greater than 35 weight percent of the second solid tackifier is a rosin isomer comprising olefinic hydrogens from unsaturation. Some exemplary second solid tackifiers contain less than 25 weight percent, or less than 15 percent of a rosin isomer comprising olefinic hydrogens from unsaturation.

In another embodiment, the acrylic block copolymer composition may comprise a first solid tackifier having a glass transition temperature of at least 20° C. and comprising at least 70 weight percent of a first rosin acid, rosin ester, or combinations thereof having zero or one carbon-carbon double bond; and a second solid tackifier having a glass transition temperature of at least 20° C. and comprising no greater than 50 weight percent second rosin acid, rosin ester or combinations thereof having zero or one carbon-carbon double bond, and a third liquid tackifier having a glass transition temperature less than or equal to 0° C.

The two solid tackifiers in the adhesive compositions have a glass transition temperature that is at least 20° C. These two tackifiers differ from each other in their degree of saturation. The first solid tackifier is more hydrogenated than the second solid tackifier. Stated differently, compared to the second solid tackifier, the first solid tackifier has a higher degree of saturation and a lower degree of unsaturation.

Each of the first and second solid tackifier can contain, for example, a mixture of rosin acids of and/or isomers thereof and/or rosin esters thereof. The distribution of these rosin acids and/or rosin esters in the first solid tackifier and in the second solid tackifiers, however, is typically different. Compared to the second solid tackifier, the first solid tackifier typically contains a greater amount of a first rosin acid and/or first rosin ester having zero or one carbon-carbon double bonds. Additionally, compared to the first solid tackifier, the second solid tackifier often, but not necessarily always, contains a greater amount of a second rosin acid and/or second rosin ester having two carbon-carbon double bonds. The first and second solid tackifiers differ most in the amount of third rosin acid and/or third rosin ester having three carbon-carbon double bonds and in the amount of the first rosin acid and/or first rosin ester having zero or one carbon-carbon double bond.

The first solid tackifier often contains more hydrogenated rosin acids and/or rosin esters than the second solid tackifier. Typically, at least 70 weight percent of the first solid tackifier is a first rosin acid and/or first rosin ester with zero or one carbon-carbon double bond. Some exemplary first solid tackifiers contain at least 75 weight percent, at least 80 weight percent, or at least 85 percent of the first rosin acid and/or first rosin ester with zero or one carbon-carbon double bond. Typically, no greater than 50 weight percent of the second solid tackifier is a first rosin acid and/or first rosin ester with zero or one carbon-carbon double bond. Some exemplary second solid tackifiers contain no greater than 45 weight percent, or no greater than 40 weight percent of the second rosin acid and/or second rosin ester with zero or one carbon-carbon double bond.

The third tackifier is a liquid or viscous fluid at room temperature or at temperatures near room temperature. This third liquid tackifier has a glass transition temperature that is no greater than 0° C. Like the first solid tackifier and the second solid tackifier, the third liquid tackifier is a rosin acid, rosin ester, or a mixture thereof. The third liquid tackifier can be a single rosin acid or single rosin ester. Alternatively, the third liquid tackifier can be a mixture of rosin acids and/or rosin esters. For more details related to the three tackifier mixture, see U.S. Pat. Appln. No. 61/057532 (Joseph et al.) for more details.

Photocrosslinkers may also be added for optional subsequent curing by UV-irradiation. Conventional crosslinking agents (both physical and chemical crosslinking agents) can be utilized in the present disclosure. Crosslinkers are optional and may be present in the compositions of the present disclosure in any suitable amount, such as, for example, amounts up to about 5 parts by weight based on 100 parts by weight of the total composition.

Other optional additives include, for example, stabilizers (e.g., anti-oxidants or UV-stabilizers), corrosion inhibitors, pigments, dyes, medicaments, thickeners (e.g., polyamides), or combinations thereof. Use of such additives is well known to those of ordinary skill in the art. The additives may be present in an amount from 0.5% by weight to 5% by weight based upon the weight of the total aerosol mixture. Certain additives may be of lower weight percent, e.g., a pigment may be added at less than 0.05% or even less than 0.005% by weight.

Preferred anti-oxidants include phenols, phosphites, thioesters, amines, polymeric hindered phenols, copolymers of 4-ethyl phenols, reaction product of dicyclopentadiene and butylene, or combinations thereof. Additional examples include phenyl-alpha-naphthylamine, phenyl-beta-naphthylamine, phenyl-beta-naphthylene, 2,2'-methylene bis (4-methyl-6-tertiary butyl phenol), phenolic-based anti-oxidants sold under the trade designation "CIBA IRGANOX 1010" by from Ciba Specialty Chemicals Corp., Tarrytown, N.Y., or combinations thereof.

UV-stabilizers such as UV-absorbers are chemical compounds that can intervene in the physical and chemical processes of photoinduced degradation. Exemplary UV-absorbers include: benzotriazole compound, 5-trifluoromethyl-2-(2-hydroxy-3-alpha-cumyl-5-tert-octylphenyl)-2H-benzotriazole, or combinations thereof. Other exemplary benzotriazoles include: 2-(2-hydroxy-3,5-di-alpha-cumylphenyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole, or combinations thereof. Additional exemplary UV-absorbers include 2(-4,6-diphenyl-1-3,5-triazin-2-yl)-5-hexyloxy-phenol, and those available from Ciba Specialty Chemicals Corp. sold under the trade designations "CIBA TINUVIN 1577" and "CIBA TINUVIN 900". In addition, UV-absorber(s) can be used in combination with hindered amine light stabilizer(s) (HALS) and/or anti-oxidants. Exemplary HALSs include those available from Ciba Specialty Chemicals Corp. sold under the trade designations "CIBA CHIMASSORB 944" and "CIBA TINUVIN 123".

Corrosion inhibitors are chemical compounds that can intervene in the chemical reactions of the composition with its metal surroundings, e.g., a storage drum or a containment vessel. Exemplary corrosion inhibitors include: sulphonates, morpholine, benzotriazole, various amines, sodium benzoate, sodium nitrite, quaternary ammonium nitrites, sodium silicate, sodium tetraborate, ammonium nitrite, acetylenic derivatives, sodium molybdate, formamide, or combinations thereof, and others well known to those of ordinary skill in the art such as those disclosed in "Corrosion Inhibitors, An Industrial Guide", by Ernest W. Flick, $2^{nd}$ ed., Noyes Publications, Park Ridge, N.J., 1993.

The present disclosure includes a solvent. The solvent is used to solubilize or disperse the composition comprising the acrylic block copolymer. The acrylic block copolymer may be soluble in the solvent or insoluble in the solvent. The glass transition temperature modifiers may be soluble in the solvent or insoluble in the solvent. The additives may be soluble in the solvent or insoluble in the solvent. As used herein, "soluble" means that when visually observed, a solution is a substantially uniform, clear or opalescent solution with no apparent particulates or gel formation. Soluble can be observed, for example, by centrifugation which results in no phase separation or change in the composition throughout the centrifugation tube, or does not phase separate upon aging.

In one embodiment, the weight of the solvent comprises less than 90%, less than 85%, less than 75%, less than 65%, or even less than 55% of the combined weight of the composition and the solvent.

Exemplary solvents include: halogenated solvents, aliphatics, cycloaliphatics, aromatics, alcohols, esters, water, ketones, or combinations thereof. Examples include: methyl acetate, acetone, ethanol, diacetone alcohol, toluene, cyclohexane, hexane, pentane, or combinations thereof.

In one embodiment, the solvent is a non-volatile organic compound (non-VOC). VOC's are organic compounds that have sufficient vapor pressures such that under normal conditions, vaporize, and enter the atmosphere. Because of the increasing concerns regarding the environment, regulations have been implemented to limit the release of VOCs into the environment. In many locations, VOCs are regulated and the regulations may differ from locale to locale. Therefore, what may be considered a non-VOC in one locale may be a VOC in another. For purposes of this disclosure, non-VOC as used herein, refers to those compounds deemed to be non-VOC according to 40 CFR (Code of Federal Regulations) §51.100(s) as of the date of filing. Exemplary non-VOC solvents : acetone, methyl acetate, parachlorobenzotrifluoride, methylene chloride, methylated siloxanes (e.g., methyl siloxane), some fluorinated solvent materials, such as, e.g., 1,1,1,2,2,3,3,4,4-nonafluoro-4-methoxybutane sold under the trade designation "3M NOVEC ENGINEERED FLUID HFE-7100" as available from 3M Company, St. Paul, Minn., or combinations thereof. See 40 CFR §51.100(s) for a complete list of non-VOC solvents.

Propellant is used to move the contained aerosol out of the containment vessel. The propellant may include a liquefied gas, a compressed gas, or combinations thereof.

Liquefied gas propellants are known to those skilled in the art. Exemplary liquefied gas propellants include: dimethyl ether, C1-C4 alkanes (such as, e.g., propane, isobutane, butane, cyclobutane, or combinations thereof), refrigerants, hydrochlorofluorocarbons, hydrofluorocarbons, or combinations thereof. Examples include: propane, isobutane, n-butane, dimethyl ether, tetrafluoroethane, 1,1-difluoroethane, or combinations thereof.

In one embodiment, the combined weight of the solvent and the liquefied gas is less than 90%, less than 85%, less than 80%, less than 75%, less than 70%, or even less than 65% of the total weight of the aerosol.

Compressed gases are known to those skilled in the art. Exemplary compressed gases include: carbon dioxide, nitrogen, nitrous oxide, compressed air, or combinations thereof.

The aerosol may be contained within an aerosol delivery device as known to those skilled in the art. Such devices include a containment vessel comprising a valve and/or an actuator. Exemplary valves and/or actuators can be obtained from SeaquistPerfect Dispensing, Cary, Ill.; Lindal Valve Co Ltd, Bedfordshire England; Newman-Green Inc., Addison, Ill.; Precision Valve Corp., Yonkers, N.Y.; and Summit Packaging Systems, Inc., Manchester, N.H. Containment vessels, such as e.g., cylinders, typically have a hose attached between the valve and the actuator (e.g., spray gun). An exemplary valve manufacturer for cylinders is Grand Gas Equipment Inc., Taichung, Taiwan.

In one embodiment, the aerosol is dispensed from the pressurized containment vessel in a mist-type pattern, a lace-type pattern, or combinations thereof. The aerosol in the mist-type pattern comprises droplets of an adhesive composition, wherein the adhesive composition comprises an acrylic block copolymer, a glass transition temperature modifier, and optionally an additive.

In one embodiment, the aerosol as disclosed herein is an adhesive. The glass transition temperatures for adhesives vary greatly, depending on the application from, for example, −60° C. to 100° C., −10° C. to 20° C., 10° C. to 70° C., or even 10° C. to 50° C., when measured by DMA (dynamic mechanical analysis). The type of monomer units used in the acrylic block copolymer, the amount of glass transition modifier, and/or the amount of additive may be adjusted to obtain an aerosol adhesive having sufficient cohesion and rheological effects.

In some embodiments, it is desirable deliver as much adhesive as possible in an aerosol spray (i.e., deliver a high solids content in the case of mist sprays or a high amount of soluble polymer concentration in the case of lace sprays). Typically however, the amount of adhesive delivered is reduced due to the solvent and propellant needed to disperse or solubilize the adhesive. In one embodiment of the present disclosure, the solids content of the adhesive sprayed is more than 10%, more than 15%, more than 20%, more than 25%, more than 30%, or even more than 35% by weight versus total weight. Typically, mist sprays have a solids content of adhesive of about 5 to 25% by weight versus total weight.

An advantage of aerosol adhesives made from acrylic block copolymers is that the acrylic block copolymer is UV-resistant and typically does not discolor as compared to styrene-butadiene rubber and nitrile aerosol adhesives, which are prone to oxidation and discoloration.

In some embodiments, the aerosol adhesives disclosed herein are useful for applying to substrates including: wood, laminates, paper, glass, carbon filter, concrete, ceramics, metals, steel, cloth, composites, plastics, vinyl, rubbers, cardboard, particle boards, plywood, fiberboard, or combinations thereof.

Advantages and embodiments of this invention are further illustrated by the following examples, but the particular materials and amounts thereof recited in these examples, as well as other conditions and details, should not be construed to unduly limit this disclosure. All materials are commercially available, for example from Sigma-Aldrich Corp., St. Louis, Mo., or known to those skilled in the art unless otherwise stated or apparent.

EXAMPLES

In these examples, all percentages, proportions, parts, and ratios are by weight unless otherwise indicated. These abbreviations are used in the following examples: g =grams, and oz.=ounce.

Example 1

The premix (PM) was prepared by placing 16.7 parts of a di-block PMMA/PnBA copolymer (available as LA1114 from Kuraray Co., Ltd., Tokyo, Japan.) where PMMA refers to poly methylmethacrylate and PnBA refers to poly n-butyl acrylate), with 33.3 parts of an ethylene glycol ester of hydrogenated resin (sold under the trade designation "SUPER ESTER A-75", Arakawa Chemical Inc., Chicago, Ill.), 33.3 parts acetone, and 16.7 parts ethanol into a container, which was sealed and placed on laboratory paint rollers overnight. After removal from the rollers, 90 g of the PM, which was a clear, thinsolution, was weighed into an 8 fluid oz. containment vessel and sealed using a valve (AR-83, SeaquistPerfect Dispensing, Cary, Ill.). Liquefied propane (30 g) was pressure charged into the sealed containment vessel. Theoretical PM Solids=50.0%, Theoretical PM VOC content=16.7%, Theoretical Aerosol Solids=37.5%, Theoretical Aerosol VOC content=37.5%.

The containment vessel was fitted with an actuator (802-24-20/0890-20FS, SeaquistPerfect Dispensing, Cary, Ill.) and the spray characteristics were examined. The spray when tested at room temperature showed a slightly coarse mist spray.

Example 2

The PM was prepared by placing 100 parts of a tri-block PMMA/PnBA/PMMA copolymer (available as LA2140e from Kuraray Co., Ltd.) with 100 parts of an ester of rosin (sold under the trade designation "SYLVALITE RE 80HP" Arizona Chemical, Jacksonville, Fla.), 15 parts dioctyl sebacate (Hallstar Solutions Corp., Bedford Park, Ill.), and 400 parts acetone into a container, which was sealed and placed on laboratory paint rollers overnight. After removal from the rollers, 96 g of the PM, which was a clear, thin solution, was weighed into an 8 fluid oz. containment vessel, which was then sealed using an AR-83 valve. Liquefied propane (24 g) was pressure charged into the sealed containment vessel. Theoretical PM Solids=35.0%, Theoretical PM VOC content=0%, Theoretical Aerosol Solids=28.0%, Theoretical Aerosol VOC content=20.0%.

The containment vessel was fitted with an 802-24-20/0890-20FS actuator and the spray characteristics were examined. The spray when tested at room temperature showed a fine mist spray.

Example 3

The PM was prepared by placing 100 parts of a tri-block PMMA/PnBA/PMMA copolymer (available as LA2140e from Kuraray Co., Ltd.) with 100 parts of SYLVALITE RE 80HP, 15 parts dioctyl sebacate, 300 parts acetone, and 100 parts pentane into a container, which was sealed and placed on laboratory paint rollers overnight. After removal from the rollers, 96 g of the PM, which was a clear, thin solution, was weighed into an 8 fluid oz. containment vessel, which was then sealed using an AR-83 valve. Liquefied propane (24 g) was pressure charged into the sealed aerosol can. Theoretical PM Solids=35.0%, Theoretical PM VOC content=16.3%, Theoretical Aerosol Solids=28.0%, Theoretical Aerosol VOC content=33.0%.

The containment vessel was fitted with an 802-24-20/0890-20FS actuator and the spray characteristics were examined. The spray when tested at room temperature showed a coarse mist spray with lots of cobwebbing.

Example 4

The PM was prepared by placing 100 parts of a tri-block PMMA/PnBA/PMMA copolymer (available as LA2250 from Kuraray Co., Ltd.) with 50 parts of polyterpene resin (sold under the trade designation "PICCOLYTE A135", Hercules Inc., Wilmington, Del.), 50 parts ester of hydrogenated rosin (sold under the trade designation "FORAL 85", Eastman Chemicals, Kingsport, Tenn.), 400 parts acetone, 100 parts cyclohexane, and 40 parts methyl amyl ketone into a container, which was sealed and placed on laboratory paint rollers overnight. After removal from the rollers, 91 g of the PM, which was a clear, thin solution, was weighed into an 8 fluid oz. containment vessel and sealed using an AR-83 valve. Dimethyl ether (33.6 g) and 8.4 g of liquefied propane was pressure charged into the sealed containment vessel. Theoretical PM Solids=27.0%, Theoretical PM VOC content=18.9%, Theoretical Aerosol Solids=18.9%, Theoretical Aerosol VOC content=43.2%.

The containment vessel was fitted with an 802-24-20/0890-20FS actuator and the spray characteristics were examined. The spray when tested at room temperature showed a fine mist spray.

Example 5

The PM was prepared by placing 100 parts of a tri-block PMMA/PnBA/PMMA copolymer (available as LA2250 from Kuraray Co., Ltd.) with 50 parts of PICCOLYTE A135, 50 parts FORAL 85, 300 parts acetone, 200 parts cyclohexane, and 40 parts methyl amyl ketone into a container, which was sealed and placed on laboratory paint rollers overnight. After removal from the rollers, 91 g of the PM, which was a clear, thin solution, was weighed into an 8 fluid oz. containment vessel and sealed using an AR-83 valve. Dimethyl ether (33.6 g) and 8.4 g of liquefied propane was pressure charged into the sealed containment vessel. Theoretical PM Solids=27.0%, Theoretical PM VOC content=32.4%, Theoretical Aerosol Solids=18.9%, Theoretical Aerosol VOC content=52.7%.

The containment vessel was fitted with an 802-24-20/0890-20FS actuator and the spray characteristics were examined. The spray when tested at room temperature showed a fine mist spray.

Example 6

The PM was prepared by placing 90 parts of a tri-block PMMA/PnBA/PMMA copolymer (available as LA2250 from Kuraray Co., Ltd.) and 10 parts of a di-block PMMA/PnBA copolymer (available as LA1114 from Kuraray Co., Ltd.) with 100 parts of a hydrogenated rosin (sold under the trade designation "FORAL 105-E", Eastman Chemicals, Kingsport, Tenn.), 60 parts butyl acetate, 400 parts acetone, and 40 parts isobutyl isobutyrate into a container, which was sealed and placed on laboratory paint rollers overnight. After removal from the rollers, 59.5 g of the PM, which was a clear, thin solution, was weighed into a 4 oz. Boston round glass containment vessel with a 20 mm neck and sealed using a 20 mm spray valve. 1,1-difluoroethane (25.4 g, sold under the trade designation "DYMEL 152a", E. I. du Pont de Nemours & Co., Wilmington, Del.) was pressure charged into the sealed containment vessel. After the addition of DYMEL 152a, a single phase clear solution resulted. Theoretical PM Solids=28.6%, Theoretical PM VOC content=14.3%, Theoretical Aerosol Solids=20.0%, Theoretical Aerosol VOC content=10.0%.

The containment vessel was fitted with an actuator (XL-100, SeaquistPerfect Dispensing, Cary, Ill.) and the spray characteristics were examined. The spray when tested at room temperature showed a fine mist spray.

Example 7

The PM was prepared by placing 100 parts of a tri-block PMMA/PnBA/PMMA copolymer (available as LA410L from Kuraray Co., Ltd.) with 75 parts of a terpene phenol resin (sold under the trade designation "SYLVARES TP 7042", Arizona Chemical, Jacksonville, Fla.), 300 parts methyl acetate, and 30 parts methyl amyl ketone into a container, which was sealed and placed on laboratory paint rollers overnight. After removal from the rollers, 91 g of the PM, which was a clear, thin solution, was weighed into an 8 fluid oz. containment vessel and sealed using a variable valve (Lindal Valve Co. Ltd., Bedfordshire, UK). Dimethyl ether (31.2 g) and 7.8 g liquefied propane were pressure charged into the sealed containment vessel. Theoretical PM Solids=34.7%, Theoretical PM VOC content=5.9%, Theoretical Aerosol Solids=24.3%, Theoretical Aerosol VOC content=34.2%.

The containment vessel was fitted with an actuator (576× 115, Lindal Valve Co. Ltd., Bedfordshire, UK) and the spray characteristics were examined. The spray when tested at room temperature showed an approximate 4.5 inch wide mist spray with a small amount of cobwebbing in the spray pattern.

Example 8

The PM was prepared by placing 100 parts of a tri-block PMMA/PnBA/PMMA copolymer (available as LA410L from Kuraray Co., Ltd.) with 75 parts of SYLVARES TP 7042, 250 parts methyl acetate, and 25 parts methyl amyl ketone into a container, which was sealed and placed on laboratory paint rollers overnight. After removal from the rollers, 91 g of the PM, which was a clear, thin solution, was weighed into an 8 fluid oz. containment vessel and sealed using a variable valve. Dimethyl ether (31.2 g) and 7.8 g liquefied propane were pressure charged into the sealed containment vessel. Theoretical PM Solids=38.9%, Theoretical PM VOC content=5.6%, Theoretical Aerosol Solids=27.2%, Theoretical Aerosol VOC content=33.9%.

The containment vessel was fitted with a 576 x 115 actuator and the spray characteristics were examined. The spray when tested at room temperature showed an approximate 3.75 inch wide lace spray with a small amount of mist overspray.

Example 9: The PM was prepared by placing 100 parts of a tri-block PMMA/PnBA/PMMA copolymer (available as LA410L from Kuraray Co., Ltd.) with 75 parts of SYLVARES TP 7042, 210 parts methyl acetate, and 20 parts methyl amyl ketone into a container, which was sealed and placed on laboratory paint rollers overnight. After removal from the rollers, 91 g of the PM, which was a clear, thin solution, was weighed into an 8 fluid oz. aerosol can and sealed using a variable valve. Dimethyl ether (31.2 g) and 7.8 g liquefied propane were pressure charged into the sealed containment vessel. Theoretical PM Solids=43.2%, Theoretical PM VOC content=4.9%, Theoretical Aerosol Solids=30.2%, Theoretical Aerosol VOC content=33.5%.

The containment vessel was fitted with a 576 x 115 actuator and the spray characteristics were examined. The spray when tested at room temperature showed an approximate 2.75 inch wide slightly heavy lace spray.

Example 10

The PM was prepared by placing 16.7 parts of a di-block PMMA/PnBA copolymer (available as LA1114 from Kuraray Co., Ltd.) with 33.3 parts SUPER ESTER A-75, 33.3 parts acetone, and 16.7 parts ethanol into a container, which was sealed and placed on laboratory paint rollers overnight. After removal from the rollers, 90 g of the PM, which was a clear, thin solution was weighed into an 8 fluid oz. containment vessel and sealed using an AR-83 valve. Liquefied propane (30 g) was pressure charged into the sealed containment vessel. Theoretical PM Solids=50%, Theoretical PM VOC content=16.7%, Theoretical Aerosol Solids=37.5%, Theoretical Aerosol VOC content=37.5%.

The containment vessel was fitted with an 802-24-20/0890-20FS actuator and the spray characteristics were examined. The spray when tested at room temperature showed a slightly coarse mist spray.

Example 11

The PM was prepared by placing 6.4 parts of a tri-block PMMA/PnBA/PMMA copolymer (available as LA2140e from Kuraray Co., Ltd.) with 4.3 parts a tri-block PMMA/PnBA/PMMA copolymer (available as LA410L from Kuraray Co., Ltd.), 6.4 parts SUPER ESTER A-75, 4.3 parts glycerol ester of rosin acid (sold under the trade designation "SUPER ESTER W-100" by Arakawa Chemical Inc.), 2.2 parts water, 47.5 parts acetone, 25.5 parts cyclohexane, and 3.3 parts diacetone alcohol, and 0.1 parts sodium benzoate into a container, which was sealed and placed on laboratory paint rollers overnight. After removal from the rollers, 87 g of the PM, which was a clear, thin solution was weighed into an 8 fluid oz. containment vessel and sealed using an AR-83 valve. Liquefied propane (33 g) was pressure charged into the sealed containment vessel. Theoretical PM Solids=21.6%, Theoretical PM VOC content=28.8%, Theoretical Aerosol Solids=15.6%, Theoretical Aerosol VOC content=48.3%.

The containment vessel was fitted with an actuator (320-20-20, Lindal Valve Co. Ltd.) and the spray characteristics were examined. The spray when tested at room temperature showed a fine mist spray.

Example 12

The PM was prepared by placing 6.9 parts of a tri-block PMMA/PnBA/PMMA copolymer (available as LA2140e from Kuraray Co., Ltd.) with 4.6 parts a tri-block PMMA/PnBA/PMMA copolymer (available as LA410L from Kuraray Co., Ltd.), 5.5 parts SUPER ESTER A-75, 3.7 parts SUPER ESTER W-100, 4.6 parts water, 46.4 parts acetone, 25.1 parts cyclohexane, and 3.2 parts diacetone alcohol, and 0.1 parts sodium benzoate into a container, which was sealed and placed on laboratory paint rollers overnight. After removal from the rollers, 72.5% of the PM, which was a clear, thin solution was weighed into an 8 fluid oz. containment vessel and sealed using an AR-83 valve. Liquefied propane (27.5%) was pressure charged into the sealed containment vessel. Theoretical PM Solids=20.7%, Theoretical PM VOC content=28.3%, Theoretical Aerosol Solids=15.0%, Theoretical Aerosol VOC content=48.0%.

The containment vessel was fitted with a 320-20-20 actuator and the spray characteristics were examined. The spray when tested at room temperature showed a fine mist spray.

As shown in the Examples above, the PM comprising the acrylic block copolymer is soluble in the solvent and surprisingly achieves a mist pattern, a lace pattern, or combinations thereof when sprayed. Further, Examples 1-3, which showed a mist spray pattern had a theoretical aerosol solids content of greater than 25%, while Examples 8-9, which showed a lace spray pattern had a theoretical aerosol solids content of greater than 27%.

Foreseeable modifications and alterations of this invention will be apparent to those skilled in the art without departing from the scope and spirit of this invention. This invention should not be restricted to the embodiments that are set forth in this application for illustrative purposes.

What is claimed is:
1. An aerosol comprising:
 (a) a composition comprising
  an acrylic block copolymer and
  a glass transition temperature modifier wherein the glass transition temperature modifier comprises: a first solid tackifier (i) having a glass transition temperature at least 20° C. and (ii) comprising a rosin having at least 35 weight percent of rosin isomers comprising olefinic hydrogens from unsaturation with at least two double bonds;
 (b) a solvent comprising at least one non-VOC solvent; and
 (c) a propellant

2. The aerosol of claim 1, wherein the aerosol comprises no more than 5 wt % water.

3. The aerosol as in claim 1, wherein the acrylic block copolymer is soluble in the solvent.

4. The aerosol as in claim 1, wherein the weight of the solvent comprises less than 85% of the combined weight of the composition and the solvent.

5. The aerosol as in claim 1, wherein the acrylic block copolymer is a di-block, a tri-block, a multi-block, or a star block copolymer.

6. The aerosol as in claim 1, wherein the acrylic block copolymer comprises:
 a) at least two $A_1$ endblock polymeric units that is each independently derived from a monoethylenically unsaturated monomer comprising a (meth)acrylate monomer, a styrenic monomer, or combinations thereof, wherein each $A_1$ endblock has a glass transition temperature of at least 50° C.; and
 b) at least one $B_1$ midblock polymeric unit that is derived from a monoethylenically unsaturated monomer comprising a (meth)acrylate monomer, a vinyl ester monomer, or combinations thereof, wherein each $B_1$ midblock has a glass transition temperature no greater than 20° C, with the proviso that at least one $A_1$ endblock polymeric unit or one $B_1$ midblock polymeric unit are derived from a monoethylenically unstaturated monomer comprising a (meth)acrylate.

7. The aerosol as in claim 6, wherein the acrylic block copolymer is a tri-block copolymer and each $A_1$ endblock comprises the reaction product of alkyl methacrylate monomers and the $B_1$ midblock comprises the reaction product of alkyl (meth)acrylate monomers.

8. The aerosol as in claim 1, wherein the acrylic block copolymer comprises a polymeric unit that is derived from a methyl methacrylate monomer.

9. The aerosol as in claim 1, wherein the acrylic block copolymer has a number average molecular weight of at least 50,000 daltons.

10. The aerosol as in claim 1, wherein the glass transition temperature modifier comprises:
 a second solid tackifier (i) having a glass transition temperature at least 20° C. and (ii) comprising a rosin having at least 35 weight percent of rosin isomers comprising olefinic hydrogens from unsaturation with at least two double bonds.

11. The aerosol as in claim 1, wherein the glass transition temperature modifier further comprises a second solid tackifier, wherein the second solid tackifier is selected from at least one of: a polyterpene resin, a phenolic resin, a coumarone-indene resin, a terpene phenolic resin, an acrylic resin, a poly-t-butyl styrene, a hydrocarbon oil, a hydrocarbon resin, an epoxy resin, a phthalate, a phosphate ester, a dibasic acid ester, a fatty acid ester, sebacate, adipate, citrate, trimellitate, dibenzoate, terephthalate, alkyl phenyl ether, or a polyether.

12. The aerosol as in claim 1, wherein the propellant comprises a liquefied gas, optionally wherein the liquefied gas comprises at least one of: propane, isobutane, n-butane, dimethyl ether, tetrafluoroethane, 1,1-difluoroethane, or combinations thereof.

13. The aerosol as in claim 1, wherein the propellant is a compressed gas, optionally wherein the compressed gas is at least one of: carbon dioxide, nitrogen nitrous oxide, compressed air, or combinations thereof.

14. The aerosol as in claim 13, wherein the propellant further comprises a liquefied gas, optionally wherein the liquefied gas comprises at least one of: propane, isobutane, n-butane, dimethyl ether, tetrafluoroethane, 1,1-difluoroethane, or combinations thereof.

15. The aerosol as claim 1, wherein a combined weight of the solvent and the propellant is less than 90% of the total weight of the aerosol.

16. The aerosol as in claim 1, wherein the non-VOC solvent comprises acetone, methyl acetate, or combinations thereof.

17. The aerosol as in claim 1, wherein the composition is an adhesive.

18. An article comprising an aerosol according to claim 1 contained within a pressurized containment vessel comprising a valve.

* * * * *